US 6,713,560 B2

(12) United States Patent
Arthur

(10) Patent No.: US 6,713,560 B2
(45) Date of Patent: Mar. 30, 2004

(54) EXPOSING CARBOXYL POLYMER-POLYEPOXIDE POWDER TO AMINE FOR POWDER COATING

(75) Inventor: Samuel David Arthur, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 78 days.

(21) Appl. No.: 10/161,871

(22) Filed: Jun. 4, 2002

(65) Prior Publication Data

US 2003/0004270 A1 Jan. 2, 2003

Related U.S. Application Data

(60) Provisional application No. 60/297,077, filed on Jun. 8, 2001.

(51) Int. Cl.[7] .......................... C08L 33/02; C08L 63/00; C08L 67/02; C08L 77/06; C08L 77/08
(52) U.S. Cl. ..................... 525/119; 525/423; 525/438
(58) Field of Search ................................ 525/119, 423, 525/438

(56) References Cited

U.S. PATENT DOCUMENTS 5,272,187 A * 12/1993 Gross et al. ................. 523/402
5,840,384 A * 11/1998 Noda et al. ................. 428/35.8

FOREIGN PATENT DOCUMENTS

| EP | 136263 A | * | 4/1985 |
| GB | 1474140 | | 4/1974 |
| GB | 2312897 A | * | 11/1997 |
| JP | 5085632 | | 3/1968 |
| JP | 50-85632 A | * | 7/1975 |
| JP | 6-329955 A | * | 11/1994 |
| JP | 9-279058 A | * | 10/1997 |

* cited by examiner

Primary Examiner—Robert Sellers

(57) ABSTRACT

A process for preparing a heat curable powder coating composition comprises exposing a powder comprising a carboxyl-functional polymer and a polyepoxy compound to an amine selected from the group consisting of organic amines and ammonia under mild conditions, particularly temperatures of between −30° C. and 50° C.

15 Claims, No Drawings

EXPOSING CARBOXYL POLYMER-POLYEPOXIDE POWDER TO AMINE FOR POWDER COATING

FIELD OF THE INVENTION

The present invention relates to the use of ammonia and organic amines as catalysts in epoxy hybrid powder coatings.

TECHNICAL BACKGROUND

Powder coatings are dry polymer powders that are coated onto a substrate and then heated to coalesce the particles and create the final coating. The technical demands on such coatings are significant: the powder must be able to be applied and cured to give a smooth coating which is strong and flexible. The binder resin must possess a rapid cure rate, at as low a temperature as possible, to allow high production throughput and minimum energy expenditure. Additionally, the powder must be non-tacky at temperatures up to 40° C. so that the particles do not clump on prolonged storage before use.

Resin curing is often catalyzed by the addition of quaternary ammonium salt or phosphonium salt catalysts. In order to be effective, these salts must be compatible with the resin and have sufficient mobility in the resin melt to diffuse to and contact the reactive groups of the resin polymer components in order to catalyze the reaction. These catalysts introduce mobile ions into the resin coating that may compromise hydrolytic and electrochemical stability. Moreover, the act of blending the catalyst into the resin composition, typically by melt extrusion, can induce premature curing of the composition. Finally, a significant amount of catalyst by weight is required in the formulation due to the typically high molecular weight of the catalyst.

A significant portion of the powder coatings market is represented by carboxyl-functional polymer-epoxy hybrids, which are combinations of epoxy resins with carboxylic acid-ended oligomers, such as polyester oligomers. The use of quaternary ammonium or amine salts or phosphonium salts as catalysts for polyester-epoxy films is well known. These materials are generally added in either melt-blending or dry compounding before application to the article to be coated. However, generally larger amounts of amine or quaternary ammonium salts must be added to allow for full curing, resulting in excess materials to be used, which subsequently stay in the cured film as a potential impurity.

GB 1,474,140 discloses the use of nitrogenous bases, or thermally decomposable salts thereof, to catalyze the reaction of an oligomeric ester or a polyester containing free hydroxyl groups but substantially no free carboxyl groups with a compound containing at least two epoxy groups.

Japanese Patent Application 50-85632 describes a heat curable coating composition comprising a polyepoxy compound and a polycarboxy compound, at least one of which is a film-forming polymer, or a film-forming polymeric compound having both epoxy groups and carboxyl groups, in combination with ammonia or an organic amine; wherein at least some of the carboxyl groups are included in the form of a salt with the ammonia or organic amine. The compositions are prepared by conventional melt mixing of the components of the heat curable composition at 80–150° C., followed by pulverizing the composition to a particle size of not more than about 200 μm.

SUMMARY OF THE INVENTION

The present invention relates to a process for preparing heat curable coating compositions, comprising exposing a powder comprising a carboxyl-functional polymer and a polyepoxy compound to an amine chosen from the group consisting of organic amines and ammonia under mild conditions.

The present invention also relates to the products made by the process described herein.

DETAILS OF THE INVENTION

It has been found that the rate of crosslinking in carboxyl-functional polymer-epoxy blends for powder coating can be greatly increased by catalytically reacting the carboxyl-functional polymer carboxylic acid end groups with ammonia or organic amines. Surprisingly, it has also been found that this reaction requires no additional compounding and may be carried out with pre-compounded epoxy-carboxyl-functional polymer powder by simply exposing the powder to ammonia or an organic amine, or mixtures thereof.

This exposure is done at a relatively mild temperature, i.e. a temperature that is not so high that it could induce premature cross-linking of the components of the coating composition. Temperatures between −30° C. and +50° C., and preferably between −10° C. and +10° C., are suitable for providing such mild conditions.

Suitable carboxyl-functional polymers for use in the process of this invention include carboxyl-functional polyester resins, carboxyl-functional polyacrylate resins, carboxyl-functional polymethacrylate resins, carboxyl-functional polyamide resins, carboxyl-functional polyimide resins and carboxyl-functional polyolefin resins. Preferred carboxyl-functional polymers are carboxylic-functional polyesters.

Suitable carboxyl functional polyester resins can be obtained by condensation polymerization of a dicarboxyl- or polycarboxyl-containing monomer with a dihydroxy or polyhydroxy monomer such that the carboxylic groups are in excess. Examples of suitable carboxyl-containing monomers are terephthalic acid, isophthalic acid, trimellitic acid, adipic acid, sebacic acid, maleic acid, and the like. Useful hydroxy compounds include ethylene glycol, propylene glycol, 1,4-butanediol, 1,6-hexanediol, diethylene glycol, dipropylene glycol, 1,4-cyclohexanedimethanol, neopentyl glycol, bis(hydroxyethyl)terephthalate, trimethylolpropane, glycerol, pentaerythritol, and the like.

Suitable carboxyl-functional acrylic resins can be obtained by polymerizing or copolymerizing a carboxyl-containing monomer such as acrylic acid, methacrylic acid or the like. Examples of monomers capable of copolymerizing with monomers such as acrylic acid, methacrylic acid and the like include acrylic acid esters, methacrylic acid esters, and other ethylene-based unsaturated monomers such as acrylonitrile, methacrylonitrile, acrylamide, methacrylamide, vinyl acetate and the like.

Suitable carboxyl-functional polyolefin resins can be obtained by copolymerizing a carboxyl-containing monomer such as acrylic acid, methacrylic, or the like with an ethylenic monomer capable of copolymerization such as ethylene, propylene, butene, butadiene, chloroprene, vinyl chloride, styrene and the like.

Suitable carboxyl-functional polyamide resins can be obtained by condensation polymerization of a dicarboxyl- or polycarboxyl-containing monomer with a diamino or polyamino monomer such that the carboxylic groups are in excess. Examples of carboxyl-containing monomers are terephthalic acid, isophthalic acid, trimellitic acid, adipic acid, sebacic acid, maleic acid, and the like. Useful amino monomers include ethylenediamine, hexamethylenediamine, dodecamethylenediamine, xylylenediamine, m-phenylenediamine, p-phenylenediamine, and the like.

Suitable carboxyl-functional polyimide resins can be obtained by condensation polymerization of a biscarboxylic anhydride-containing monomer with a diamino or polyamino monomer such that the carboxylic groups are in excess. This can be accomplished either by using the bisanhydride monomer in excess or by effecting only partial condensation such that free carboxyl groups adjacent to amidized carboxyls remain un-imidized. Examples of carboxylic anhydride-containing monomers include pyromellitic dianhydride, benzophenonetetracarboxylic dianhydride and biphenyl tetracarboxylic dianhydride. Useful amino monomers include ethylenediamine, hexamethylenediamine, dodecamethylenediamine, xylylenediamine, m-phenylenediamine, p-phenylenediamine, and the like.

Suitable polyepoxy compounds include epoxy compounds or resins having two or more glycidyl groups in one molecule. Such compounds, often used as curing agents, are a reaction product of a phenolic compound such as bisphenol A, phenol novolac, or the like with epichlorohydrin; a reaction product of a cresolic compound such as cresol novolac or the like with epichlorohydrin; a glycidyl ether obtained from a reaction of an alcoholic compound such as ethylene glycol, propylene glycol, 1,4-butanediol, polyethylene glycol, polypropylene glycol, neopentylglycol, glycerol, or the like with epichlorohydrin; a glycidyl ester obtained from a reaction of a carboxylic acid compound such as succinic acid, adipic acid, sebacic acid, phthalic acid, terephthalic acid, hexahydrophthalic acid, trimellitic acid, or the like with epichlorohydrin; 3,4-epoxy-6-methylcyclohexylmethyl 3,4-epoxy-6-methylcyclohexanecarboxylate, 3,4-epoxycyclohexylmethyl 3,4-epoxycyclohexanecarboxylate, or the like; triglycidyl isocyanurate (TGIC) and its derivatives; and the like. Preferred epoxy compounds are TGIC and the reaction product of bisphenol A and epichlorohydrin.

Organic amines suitable for the process of this invention include $C_1$–$C_{12}$ alkylamines, $C_6$–$C_{12}$ arylamines, $C_7$–$C_{12}$ alkarylamines, and $C_7$–$C_{12}$ aralkyamines. More specifically, suitable organic amines include primary amines such as methylamine, ethylamine, propylaamine, butylamine, ethylenediamine, methanolamine, ethanolamine, aniline, cyclohexylamine, benzylamine and the like; secondary amines such as dimethylamine, diethylamine, dipropylamine, dibutylamine, dimethanolamine, diethanolamine, diphenylamine, phenylmethylamine, phenylethylamine, dicyclohexylamine, piperazine, imidazole, 2-methylimidazole, 2-ethylimidazole, 2-ethyl-4-methylimidazole, 2-isopropylimidazole, 2-phenylimidazole, 2-methylimidazoline, 2-phenylimidazoline and the like; and tertiary amines such as trimethylamine, triethylamine, dimethylhexylamine, N-methylpiperazine, dimethylbenzylamine, dimethylaniline and the like. The organic amines or ammonia can be used in the gaseous form or dissolved in a suitable aqueous or non-aqueous solvent. Aqueous ammonia and triethylamine are preferred.

The advantage of catalysis by ammonia is that the cation is highly mobile from the standpoint of diffusion through the polymer melt and may ultimately diffuse out of the polymer, leaving little or no catalyst residue in polymer. Also the catalyst is present only where it is needed, namely at the carboxylic ends where the reaction takes place with epoxides; this makes the catalysis much more efficient than the addition of conventional quaternary ammonium salt catalysts, which have much higher molecular mass and thus require a greater mass of catalyst to be effective. Finally, no persistent ionic species are introduced into the coating that might compromise hydrolytic and electrochemical stability. An additional advantage of this process is that it can enhance the "anti-blocking" effect of the ammonia. The ammonium salt of some carboxyl-functional polymers, such as polyesters, have a higher softening temperature than the free carboxylic acid, which increases the temperature stability of the powder with regard to clumping. If the ammonium salt is present in higher concentrations at the surface of the particles than at the center of the particle, the anti-blocking effect should be enhanced for a given level of ammonia.

An illustrative example of a polyester ammonium salt-epoxy resin curing reaction is shown in Equations 1 and 2.

Equation 1

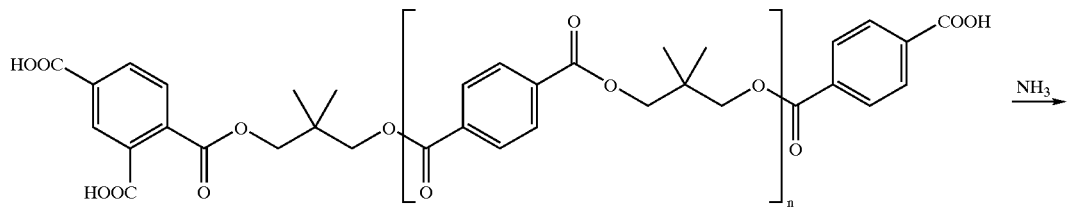

polyester resin

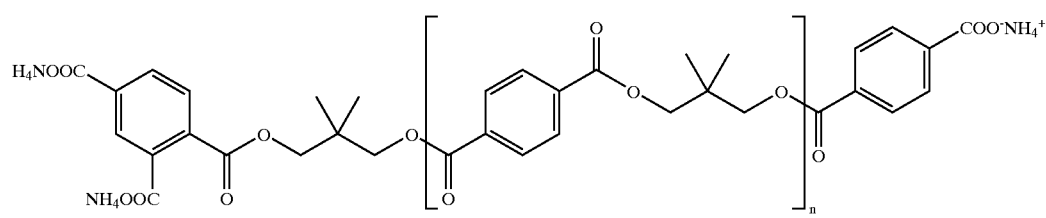

polyester resin ammonium salt

-continued

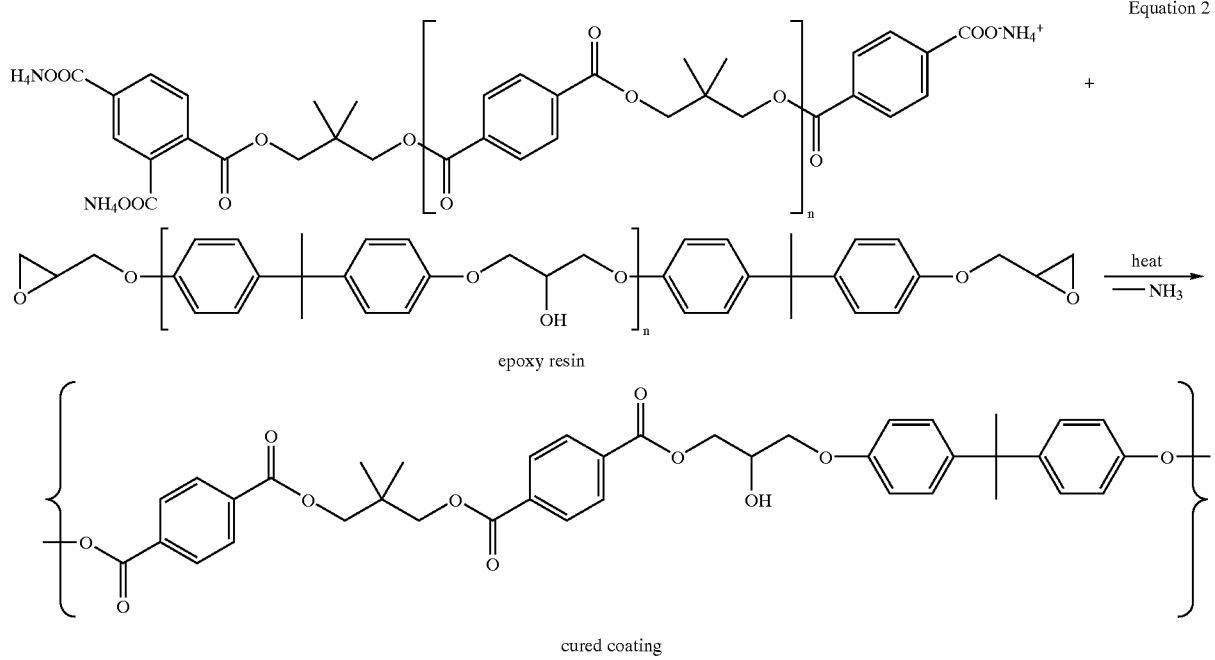

Equation 2 epoxy resin cured coating

The same benefits in cure rate enhancement are realized by reacting organic amines with the polymer carboxyl groups as are realized by reacting the carboxyl groups with ammonia, with the additional benefit in the former case of reducing yellowing in the cured coating. Conversion to the carboxyl-functional polymer alkylammonium salt may be accomplished by treating the powdered carboxyl-functional polymer-epoxy blend with an organic amine. Triethylamine is preferred.

The invention thus also provides a process for preparing a heat curable coating composition by exposing a powder that contains a carboxyl-functional polymer and a polyepoxy compound to a catalyst that is non-ionic, or is free, or substantially free, of ions, such as cations or anions. The catalyst may be a nitrogen-containing compound such as an organic amine or ammonia. The invention also provides a cured coating composition prepared from a powder that contains or is prepared from a carboxyl-functional polymer and a polyepoxy compound, wherein the curing of the composition is catalyzed by a nitrogen-containing compound, such as an organic amine or ammonia, and the composition is free, or substantially free, of catalyst residue, such as ionic catalyst residue, or is free, or substantially free, of ions, such as cations or anions. An article of manufacture may be coated by such composition.

While general practice for this invention is to expose the carboxyl-functional polymer-epoxy materials to ammonia and/or amine before application to a substrate to be coated, it is contemplated that the powder could be applied to the item, with subsequent exposure to ammonia and/or amine as described above.

Once the substrate has been coated with the powder, by any common means for applying powder coating to a substrate including but not limited to spray or fluidized bed application, it is generally baked to effect flow and cure of the powder. Generally, this curing is done at temperatures of 150° C. and above. These substrates are used to make any number of articles of manufacturing, including, but not limited to, original equipment parts for automotive and other end-uses.

EXAMPLES

Three types of resin powders were used in the examples below:

Gray #1: a gray pigmented 54:46 neopentylglycol terephthalate carboxy polyester (AEW=740)/bisphenol A epoxy resin (EEW=740) containing about 13 pph $TiO_2$, d90=60 microns.

White #2: an ammonium salt-catalyzed 92:8 neopentylglycol terephthalate carboxy polyester (AEW=1280)/TGIC resin containing about 35 pph $TiO_2$, d90=60 microns.

Clear #3: an unpigmented 50:50 carboxy polyester (AEW=700)/bisphenol A epoxy resin (EEW=700), d90=90 microns.

All three powder samples contain about 0.5–1% benzoin as a degassing aid. AEW=acid equivalent weight; EEW=epoxide equivalent weight.

Examples 1–9

Gaseous Ammonia Treatment of Polyester-Epoxy Hybrid Resins

Samples of commercial powder coating resins were stiffed in a resin kettle with a paddle stirrer as gaseous ammonia was passed over the powder for 60 min at room temperature. A mild exotherm was observed due to the heat of reaction of ammonia with COOH in the powdered resin. For samples larger than about 100 g, external cooling with an ice water bath was necessary to prevent side reactions (premature curing leading to higher melt viscosity).

The ammonia-treated commercial powder coatings were then dry tumble-blended with various proportions of untreated powder to vary the amount of ammonia in the formulations. Samples of the blends were subjected to gel pill test (also known as the inclined plate flow test) and dynamic differential scanning calorimetry (dynamic DSC) to determine the relative curing rates vs. ammonia content.

Gel pill test conditions: 200° C./15 min; static oven (no air circulation) flowdown surface was PTFE-coated aluminum foil taped to a steel panel; angle was 42° from horizontal. The 1.3-cm pills were pressed from 0.70 g powder in a Parr hand pellet press. Flow distance was measured from the front of the pill; a shorter melt flow distance before gelatin implies a faster crosslink rate.

Dynamic differential scanning calorimetry (Dynamic DSC) was performed using a DuPont 912 differential scanning calorimeter. Samples size was 10–15 mg polymer powder; the heating rate was 10° C./min. Cure rate in epoxy formulations can be correlated with the peak temperature of the exothermic peak in the dynamic DSC scan (R. Prime, "Thermosets" in *Thermal Characterization of Polymeric Materials,* E. Turi, ed; Academic Press, 1981). A lower peak temperature implies greater reactivity; i.e., the curing chemistry occurs at a lower temperature. Likewise, the heat of reaction (the integrated area under the exothermic peak) can be correlated with the degree of cure (i.e., number of epoxy groups reacted). A smaller-than-expected value for the heat of reaction implies that pre-reaction has occurred during processing (e.g., melt extrusion); i.e., there are fewer remaining active groups to chemically react during the curing reaction.

Table 1 summarizes the thermal data for the various ammonia-treated powders and controls.

TABLE 1

Thermal Analysis of Ammonia-Treated Powder Coatings

| Example # | Coating Powder | % $NH_3$-Treated Powder | DSC $T_{peak}$ (° C., 10°/min) | 200° C. Gel Pill (cm) |
|---|---|---|---|---|
| Control A | Untreated Gray #1 (control) | 0 | 183 | 8.8 |
| 1 | Untreated Gray #1 + $NH_3$-treated Gray #1 (3:1) | 25 | 175 | 4.7 |
| 2 | Untreated Gray #1 + $NH_3$-treated Gray #1 (1:1) | 50 | 173 | 3.3 |
| 3 | $NH_3$-treated Gray #1 | 100 | 150 | 2.0 |
| Control B | Untreated White #2 (control) | 0 | 167 | 4.2 |
| 4 | Untreated White #2 + $NH_3$-treated White #2 (3:1) | 25 | 168 | 2.0 |
| 5 | Untreated White #2 + $NH_3$-treated White #2 (1:1) | 50 | 163 | 1.1 |
| 6 | $NH_3$-treated White #2 | 100 | 147 | 0.6 |
| Control C | Untreated Clear #3 (control) | 0 | 194 | 12.0 |
| 7 | Untreated Clear #3 + $NH_3$-treated Clear #3 (3:1) | 25 | 139/189 | 4.5 |
| 8 | Untreated Clear #3 + $NH_3$-treated Clear #3 (1:1) | 50 | 138 | 3.0 |
| 9 | $NH_3$-treated Clear #3 | 100 | 147 | 1.7 |

The progressively lower DSC peak exotherm temperatures and shorter gel pill melt flows vs. ammonia content illustrate the catalytic effect of ammonia. The heats of reaction for these polyester-epoxy formulations as measured by DSC were basically unchanged by ammonia treatment, the heats of reaction varying by only about 10%, which is close to experimental error.

Zinc-phosphated steel panels were electrostatically sprayed with the polyester-TGIC powder blends (Control B and Examples 4–6) and baked at 200° C. for 20 min. The coatings were then tested for hardness (D3363), impact strength (ASTM D2794), flexibility (ASTM D1737), cure state (MEK rubs) and adhesion. The glossy white coatings were 1–1.5 mils (25–40 microns) thick. Coating adhesion was excellent in all cases; all panels passed the crosscut adhesion test (ASTM D3359) with duct tape. The MEK (methyl ethyl ketone) double rubs were performed by covering the ball end of a two-pound ball peen hammer with six layers of cheesecloth wet with MEK; the cheesecloth-coated hammer was rested on the panel surface and was drawn back and forth (constituting one "double rub") across it using the weight of the hammer to apply pressure. The damage caused to the coating by MEK was rated as follows: 1=No Damage; 2=Slight matting or scratches; 3=Moderate scratching; 4=Heavy damage; 5=Coating fully destroyed. The coating properties are summarized in Table 2.

TABLE 2

Ammonia-Treated Polyester Hybrids - Panel Properties

| Example # | Pencil hardness | Impact, Direct/reverse (kg-cm) | Zero T-bend | 200 MEK double rubs rating |
|---|---|---|---|---|
| Control B | 3H | 290/290 | pass | 2 |
| 4 | 3H | 290/290 | pass | 2 |
| 5 | 3H | 290/290 | pass | 3 |
| 6 | 3H | 290/290 | pass | 2 |

The improved thermal stability of the ammonia-treated powders was demonstrated in the following manner. Samples (~1 g) of ammonia-treated powder coatings were placed in glass vials in an oven at 40° C. for 24 hr. The powders were all still free-flowing, so they were subjected to 50° C. for another 24 hr. The ammonia-treated powders remained free-flowing after the additional 24 hr at 50° C. Control A and Control B (virgin Gray #1 and White #2 powders which were not ammonia-treated) remained free-flowing after the 40° C./24 hr test but became solid masses after 24 hr at 50° C.

The ammonia-treated powders (Examples 3, 6, 9) maintained their curing reactivity after 24 hr at 40° C. plus 24 hr at 50° C., as demonstrated by dynamic DSC and gel pill test, summarized in Table 3.

TABLE 3

Dynamic DSC and Gel Pill Test after Powder Stability Test

| Example # | Heated 40° C./24 hr, 50° C./24 hr | DSC $T_{peak}$ (° C., J/g) | 200° C. Gel Pill (cm) |
|---|---|---|---|
| 3 | No | 147, 13 | 1.7 |
| 3 | Yes | 148, 10 | 1.5 |
| 6 | No | 147, 12 | 0.5 |
| 6 | Yes | 147, 11 | 0.3 |
| 9 | No | 147, 25 | 1.6 |
| 9 | Yes | 148, 18 | 1.8 |

Examples 10–11

Triethylamine Treatment of Polyester-Epoxy Hybrid Resin

Example 10

A suspension of 14 g Clear #3 (this sample contains about 10 mmol COOH) in 50 mL hexane was magnetically stirred under nitrogen and cooled in an ice-water bath. One gram (10 mmol) of triethylamine was added and the mixture was stirred 16 hr as it warmed to room temperature. The slurry was suction-filtered on a fritted funnel, washed twice with 15 mL hexane and air-dried under suction for 6 hr to yield a fine powder. The powder was accelerated by triethylamine and exhibited no yellowing in the gel pill test (see Table 4).

Example 11

A suspension of 10 g Clear #3 (this sample contains about 7 mmol COOH) in 50 mL hexane was magnetically stirred under nitrogen with 1 g (10 mmol) of triethylamine for 90 hr at room temperature. The slurry was suction-filtered on a fritted funnel, washed with 30 mL hexane and air-dried under suction to yield a fine powder. This powder was accelerated by triethylamine and also exhibited no yellowing in the gel pill test (see Table 4).

Table 4

Thermal Analysis of Triethylamine-Treated Powder Coatings

| Example # | DSC $T_{peak}$ (° C., J/g) | 190° C. Gel Pill (cm) |
|---|---|---|
| Control D | 194, 38 | 15.3 |
| 10 | 181, 40 | 9.3 |
| 11 | 159, 37 | 4.4 |

What is claimed is:

1. A process for preparing a heat curable coating composition, comprising exposing a powder comprising a carboxyl-functional polymer and a polyepoxy compound to an amine selected from the group consisting of organic amines and ammonia under mild conditions.

2. The process of claim 1, wherein said carboxyl-functional polymer is selected from the group consisting of carboxyl-functional polyester resins, carboxyl-functional polyacrylate resins, carboxyl-functional polymethacrylate resins, carboxyl-functional polyamide resins, carboxyl-functional polyimide resins and carboxyl-functional polyolefin resins.

3. The process of claim 2, wherein said carboxyl-functional polymer is a carboxyl-functional polyester resin.

4. The process of claim 1, wherein said organic amine is selected from the group consisting of $C_1$–$C_{12}$ alkylamines, $C_6$–$C_{12}$ arylamines, $C_7$–$C_{12}$ alkarylamines, and $C_7$–$C_{12}$ aralkyamines.

5. The process of claim 4, wherein said organic amine is selected from the group consisting of methylamine, ethylamine, propylamine, butylamine, ethylenediamine, methanolamine, ethanolamine, aniline, cyclohexylamine, benzylamine, dimethylamine, diethylamine, dipropylamine, dibutylamine, dimethanolamine, diethanolamine, diphenylamine, phenylmethylamine, phenylethylamine, dicyclohexylamine, piperazine, imidazole, 2-methylimidazole, 2-ethylimidazole, 2-ethyl-4-methylimidazole, 2-isopropylimidazole, 2-phenylimidazole, 2-methylimidazoline, 2-phenylimidazoline, trimethylamine, triethylamine, dimethylhexylamine, N-methylpiperazine, dimethylbenzylamine, and dimethylaniline and mixtures thereof.

6. The process of claim 1, wherein said amine is in a state selected from the group consisting of vapor, liquid or dispersed in a solvent.

7. The process of claim 1, wherein said powder is exposed to ammonia.

8. The process of claim 1, wherein said powder is exposed to aqueous ammonia.

9. The process of claim 5, wherein said organic amine is triethylamine.

10. The process of claim 1, wherein said mild conditions comprises temperatures between −30° C. and +50° C.

11. The process of claim 10, wherein said mild conditions comprises temperatures between −10° C. and +10° C.

12. The process of claim 1, wherein said exposure occurs before said powder is applied to a substrate.

13. The process of claim 1, wherein said exposure occurs after said powder is applied to a substrate.

14. The product of the process of claim 1, 11 or 12.

15. A process for preparing a heat curable coating composition, comprising exposing a powder comprising a carboxyl-functional polymer and a polyepoxy compound to a catalyst that is a non-ionic nitrogen-containing compound substantially free of ions.

* * * * *